H. BURRMANN.
STOCK WATERING AND FEEDING MACHINE.
APPLICATION FILED SEPT. 2, 1919.
1,381,400.
Patented June 14, 1921.
4 SHEETS—SHEET 1.
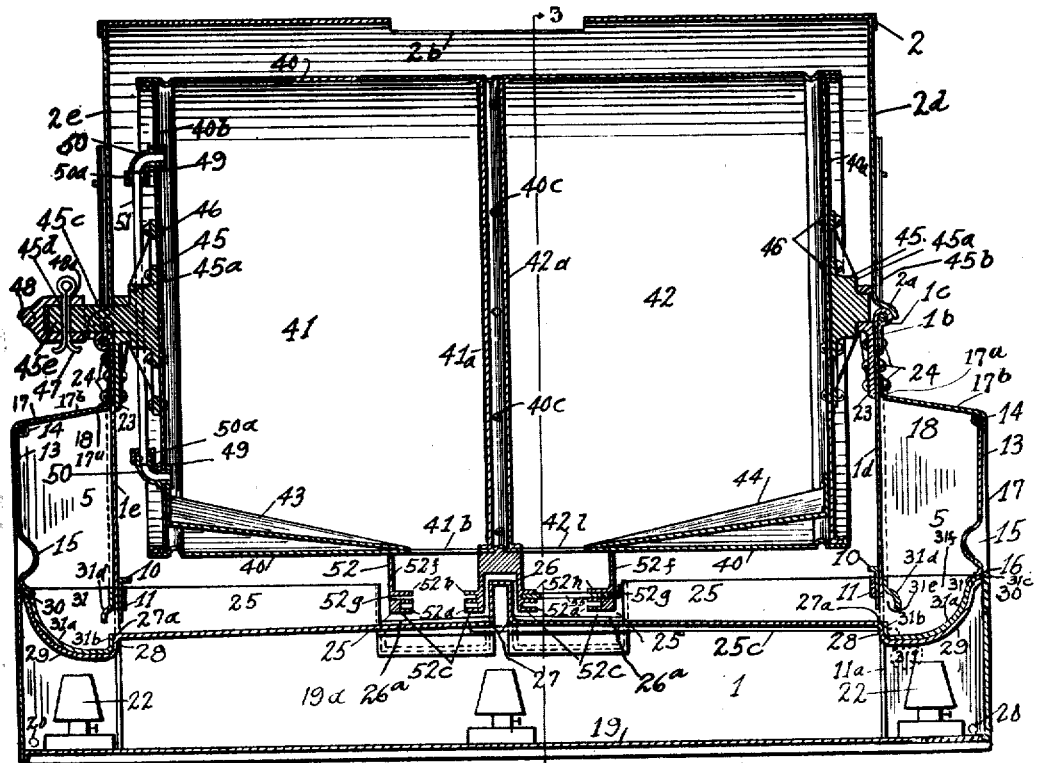
INVENTOR:
HENRY BURRMANN
PER Andrew L. Chezem.
ATTORNEY

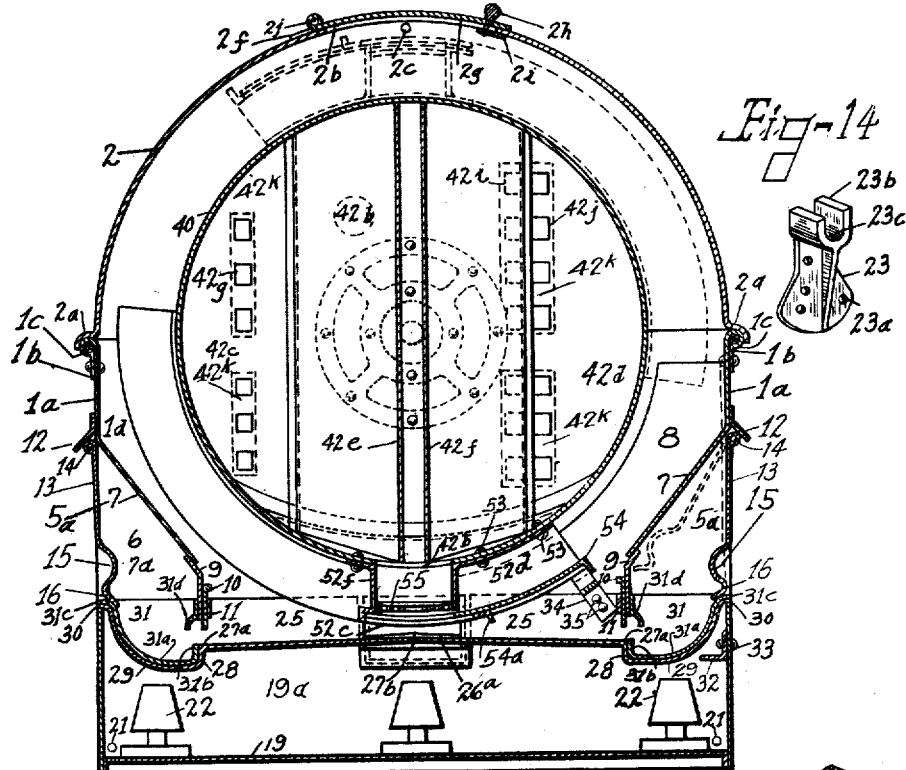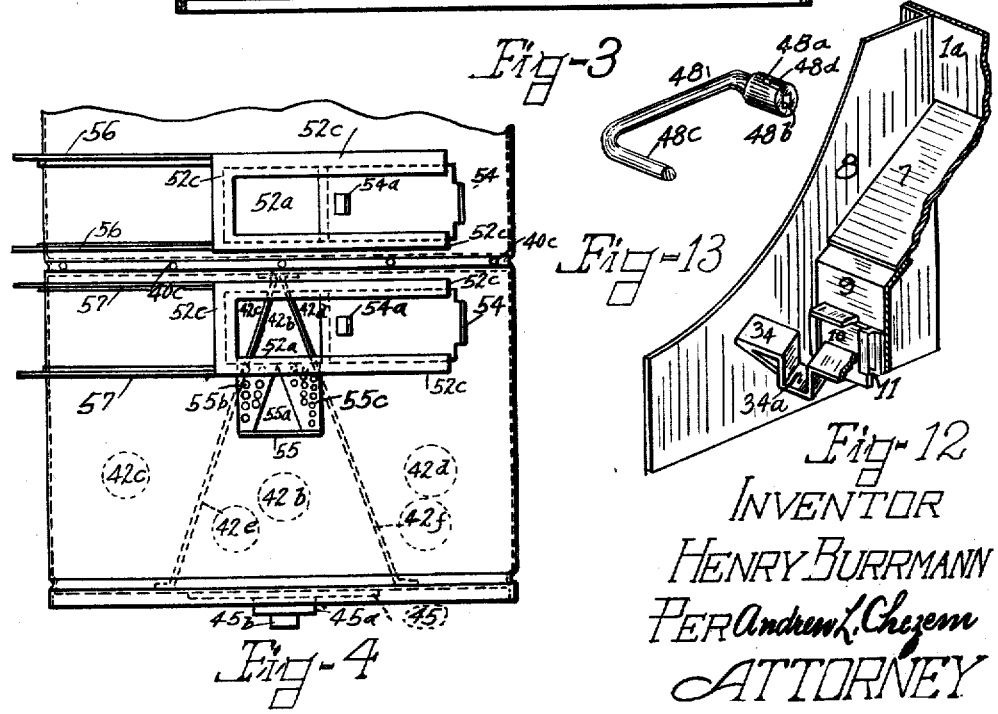

H. BURRMANN.
STOCK WATERING AND FEEDING MACHINE.
APPLICATION FILED SEPT. 2, 1919.
1,381,400.
Patented June 14, 1921.
4 SHEETS—SHEET 3.
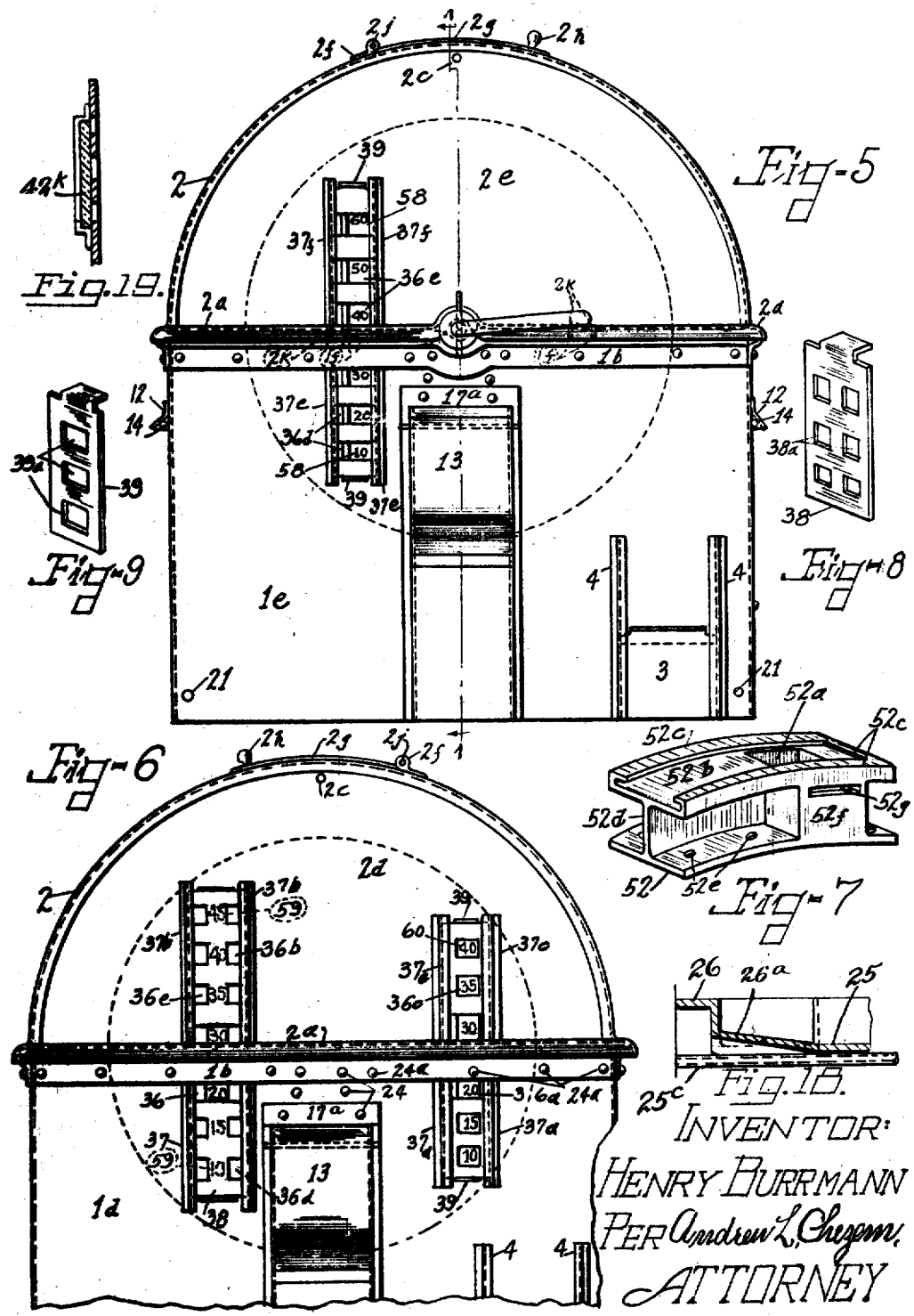

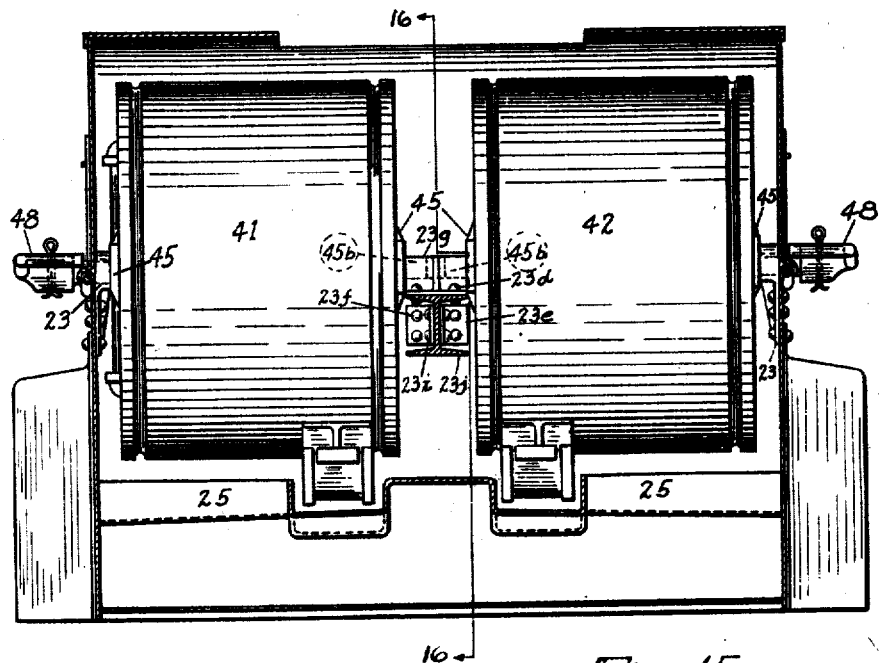
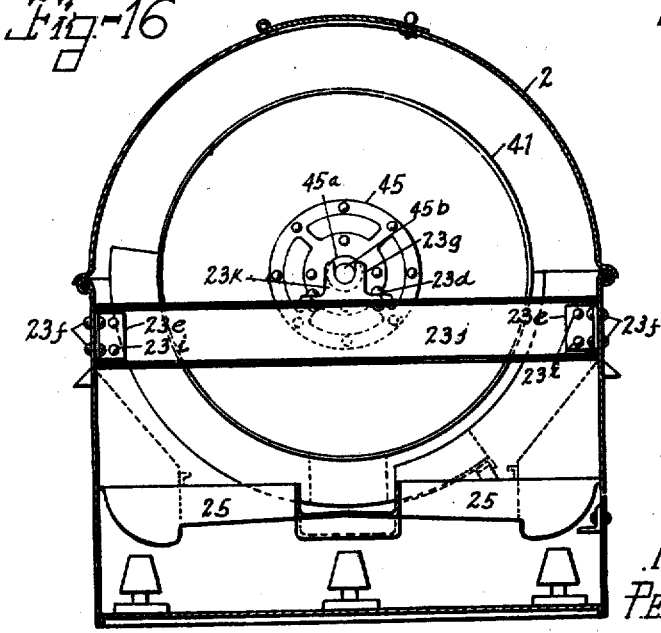
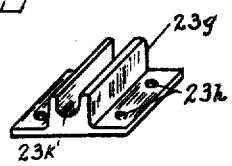
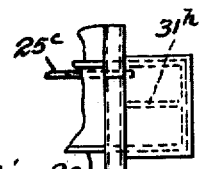

UNITED STATES PATENT OFFICE.

HENRY BURRMANN, OF DAVENPORT, IOWA.

STOCK WATERING AND FEEDING MACHINE.

1,381,400.   Specification of Letters Patent.   Patented June 14, 1921.

Application filed September 2, 1919. Serial No. 321,156.

*To all whom it may concern:*

Be it known that I, HENRY BURRMANN, a citizen of the United States, residing at Davenport, in the county of Scott and State of Iowa, have invented a new and useful Stock Watering and Feeding Machine, of which the following is a specification.

My invention is a stock watering and feeding machine, in which a rotatable container mounted within a covered box is provided with compartments opening into a supply pan, having compartment walls, opening into supply channels, which supply channels are slopingly constructed to discharge its contents into troughs.

The objects of my invention are, the automatic serving to animals, of water, stock foods, medicines, slops, mashes, small grains, dry and wet, shelled corn and any other ingredients which may be desired to be fed, either one ingredient alone in the device or as many as desired at the same time, continuously from the same machine; the providing and serving to animals food and water in accessibility in all seasons of the year, in quantities of each sufficient to provide them for several days without replenishment or visitation by their keeper, at all such times, however keeping the water separate from the food, yet each equally accessible to the animal; providing means of alternately feeding or watering or denying each or either, as occasion may require, thus regulating through the day, for several days the food and water to be given; providing a machine capable of accommodation to the use of artificial heat, to heat the contents thereof; or the contents of any desired compartment thereof; or to heat the contents issuing from any compartment while in the troughs, to any desired heat, for any desired use, even to extent, in foods, of cooking the same, without any interference with or disturbance of any other portion or part of the contents or the supply portion of the part cooked, and to retain the heat, within the machine, during the process of use, by the animal; to provide a machine more capable of being successfully iced, with the intent and effect of cooling the contents and of retaining the cool air within the machine during process of use by the animal; to provide a machine wherein different particular contents contained therein may be served automatically by it, at different times of the day or night, the other contents contained therein, during such times being shut off, yet any particular content contained therein being therewith servable or deniable, at all times, separately from the other; to provide a machine capable of regulating the quantity of food served; to provide a machine in which the quantity of its contents, or of any compartment thereof, may be ascertained at any time without disconnecting any part thereof; to provide a machine in which its entire contents whether of solids or liquids will automatically be delivered into troughs for consumption by the animal; to provide a machine having a cylindrical rotatable container capable of being rotated and yet held at either filling or delivering position by its rotating means; to provide a machine capable of being securely locked either in or out of delivering position, and so to provide against meddlers; to provide a machine capable of supplying its contents on each of its four sides to animals, thus supplying at the same time a greater number of animals, and to different animals in separate lots or pens, automatically at the same time.

Other objects will appear as the specifications are considered.

I attain these objects by the mechanism illustrated in the accompanying drawing, in which:

Figure 1 is a longitudinal section taken on line —1—1— of Fig. 5, showing gage means in cross section.

Fig. 2 is a plan view of a broken portion of the box-base disclosing inner and outer construction.

Fig. 3 is a transverse end view of the device taken on line —3—3— of Fig. 1.

Fig. 4 is a bottom view of a broken portion of a cylindrical container.

Fig. 5 is an end elevation of the device.

Fig. 6 is an end elevation of a broken portion of the device.

Figs. 7 to 14 inclusive, are detail views.

Fig. 15 is a side elevation, showing the divided container mounted.

Fig. 16 is a transverse sectional view taken on line ("16—16" of Fig. 15).

Fig. 17 is a detail view.

Figs. 18, 19 and 20 are detail views.

Similar letters refer to similar parts throughout the several views.

The box-base 1, constitutes the groundwork of my invention.

The box-base 1, is constructed with a closed bottom 19, and rolled edges $1^b$, the rolled edges inclosing a rod $1^c$, for the purpose of adding strength and to provide an even surface upon which to closely fit the cover when mounted. In either end of the base in the rolled edges $1^b$ are provided small holes $1^f$, passing through rod $1^c$, and which are in alinement with holes $2^k$ of flanges $2^a$, cover 2 of box base 1, for the purpose of applying a lock, of any suitable character such as a pad lock, having a latch hook of dimensions conformable to said holes, whereby the base 1, cover 2 and lever 48, are locked together. In the top edge of each end $1^d$ and $1^e$ of box 1 are centrally provided boxings 23, secured to said box-base 1 by rivet means 24.

Within said box-base 1, is rotatably mounted a cylindrical container 40, by means of flanged journals 45 attached centrally to each end, $40^a$ and $40^b$, of such cylindrical container 40, by rivet means 46 attached within the radius of such journal flanges. The journal shoulders, $45^a$ operate as bosses between the cylindrical container 40 and the boxings 23, of box-base $1^d$ and $1^e$ which journal shoulders $45^a$ are reduced to journals $45^b$ and $45^c$, which operate rotatably in journal boxings 23 of said box-base; the outward end $45^e$ of journal $45^c$ being squared, and having therein a hole $45^d$ for the admission of a rivet shown as cotter pin 47 for securing rotating handle 48 thereto.

Rotating handle 48 referred to has each end bent at right angles in the same direction and is provided in one bent end $48^d$ with a conformable square end-hole $48^b$ for fitting to journal $45^e$ in rotating or holding in place cylindrical container 40, and such bent end $48^d$, of said handle 48, has a hole $48^a$ through each wall of said square end hole $48^b$ for the reception of said rivet 47 shown as cotter pin, the other bent end $48^c$ of said handle being longer than the bent end $48^d$, and is so bent and made for the purpose of providing a handle means for operating the handle 48, when attached to journal $45^e$ in rotating the rotatable cylindrical container 40, and for the purpose of providing a stop-handle limiting the circulatory motion of said handle to the horizontal top edge frame $2^a$ of the box-base cover 2, when rotating the said rotatable cylindrical container 40, from and to its positions of filling and delivering, and to provide means whereby the machine may be locked in such positions.

Over all conformably to said cylindrical container 40, and box-base 1, is a cover 2, having sloping flanges $2^a$ on its four sides; at one end in the flanges $2^a$ are bored holes $2^k$, two at either side of the center line of said cover 2, for inserting the latch-hook of an ordinary pad lock (not shown), said cover 2 being further provided on the top with an opening $2^b$ for the purposes of filling the cylindrical container 40, through its bilge, when the two are brought in apposition by revolving the container, without removing said cover 2, said opening $2^b$ being provided with a hinged cover $2^g$, and is secured by hinge (jaw $2^f$ and pin $2^j$) means to said cover, and latched thereto by knob $2^h$, and staple $2^i$; and at either end $2^e$ and $2^d$ of cover 2, near the top thereof are provided vent holes $2^c$, to supply air therein.

At end $2^e$ of cover 2 on one side of center vertically located corresponding to the location of the gage 51, of cylindrical container 40 compartment 41, when cylindrical container is in delivering position, are provided windows 58, which windows are covered preferably by non-transparent slides 39, but may as well be covered by a transparent substance and are for the purpose of ascertaining the contents and quantity through viewing the gage 51, of container 40, compartment 41; which cover slide 39, is formed with sectional apertures $39^a$ conformable to the apertures 58 of said cover 2, to facilitate use, without complete removal of the slides 39 of box-base cover 2 by revolving the container 40, until the areas of the corresponding apertures in the ends of compartments $42^b$, $42^c$, $42^d$ of the container 40 aline.

Said slide 39 is held in place by grooved guides $37^f$, framed about the sides of the apertures of the said cover 2.

At end $2^d$ of cover 2, on each side of center vertically located, corresponding to the location of gages $42^g$ and $42^i$ and $42^j$ of cylindrical container 40, of compartments $42^c$, $42^b$ and $42^d$, when cylindrical container 40 is in delivering position, are provided windows, $36^c$, corresponding to gage $42^g$ and window $36^b$ corresponding to both gages $42^i$ and $42^j$, which gages are constructed with transparent substance $42^k$, said windows are covered by non-transparent slides 38 and 39, but may as well be covered by a transparent substance, and are for the purpose of ascertaining the contents and quantity, through viewing the gages $42^g$, $42^i$ and $42^j$ of the respective compartments $42^c$, $42^b$ and $42^d$ of cylindrical container 40, when the said container 40, is rotated into delivering position, which cover slides 38 and 39, are formed with sectional apertures $38^a$ and $39^a$ respectively, conformable to the apertures $36^c$ which conform to $39^a$, and $36^b$ which conform to $38^a$ of said cover 2, when the cylindrical container 40 is rotated into filling or delivering position and the gage openings of the said cylindrical container are thus brought into alinement with the gage openings of the box-base end $1^e$ and by this manner caused to disclose the amount and nature of the contents in each compartment without removing the box-base cover 2, from the box-base 1, or opening the container.

Said slides 38 and 39 are held in place by grooved guides $37^c$ and $37^b$, framed about the sides of the apertures of said cover 2.

It will be observed that in mounting the cylindrical container 40, within box-base 1, the ends of the container fit very closely into the ends of the base, so that unless an extension housing 17, is made in the ends of the base, sufficient room could not be had for the trough and cover apparatus designed, therefore I have designed an extension 17, for the respective ends of said base 1. In the ends $1^d$ and $1^e$, I have cut away a portion in the form of an oblong hole $11^a$, the top thereof being slightly above the bottom of the supply channel, 25, the bottom thereof being the bottom 19 of the box-base 1 and its width corresponding to the width of supply channels 25.

On that part of the ends $1^d$ and $1^e$ of box-base 1, forming a lintel at the top of the cut away portion and on the rear side thereof, I provide guide means 11, consisting of grooved flanges laterally attached thereto by any suitable means for the purpose of admitting and retaining a slide 10, which slide is used to regulate the out-flow of the quantity of contents through the channel 25 into trough 31, being so arranged thereby that the same may be raised or lowered.

About and above the said openings $11^a$, I provide said end extension housings 17, for the purpose hereinbefore stated, the bottom of which is an extension of the bottom of box-base 1; its sides 18, attached flangedly to the ends $1^d$ and $1^e$, and its top $17^b$ slopingly extending outward and downward from the ends $1^d$ and $1^e$ at a point immediately below the journal flange $17^a$ in such end, past and inclosing such sides 18, to which the same is attached, reaching and forming the top $17^b$ of extension housing 17, thus forming an outward wall of such extension housing 17.

Between the side walls 18 of extension housing 17 I have provided a rectangular doorway 5, in which the door 13, is hung by any suitable means 14, so that the same will admit of the animal inserting its head for consumption purposes therethrough and into troughs 31, contained within and housed by said extension housing.

In the lower end of said door 13, I provide a corrugation 15, to facilitate the easy movement thereof by the animal, the extreme lower end of said door 13, being flanged inwardly to prevent the same engaging fixedly the nose of the animal when the same is being withdrawn from the said trough and to cause the same to swing shut when not forced open by the animal.

Conformably to the said inwardly flanged portion 16, of said door 13, I have provided a flanged door sill $31^c$, at the bottom of door opening 5, upon which such flanged portion 16, of said door 13, closes and fits snugly by automatic movement when the door 13 swings shut, thus retaining the temperature within box-base 1.

Within said extension housing 17, I mount supply channels 25 which are mounted by hook flanges 30 attached suspended from the bottom of doorway 5, said supply channel 25 extending inwardly and of width equal to said housing and longitudinally across said extension housing 17, into the main part of box-base 1.

Within the outer end of said supply channel 25, I mount a demountable trough 31, of dimensions conformable to the shape of said extension housing 17, and drop end supply channel 25, the outer end of trough 31, and supply channel 25, being respectively formed concavedly, and are respectively designated as trough-end $31^a$ and supply channel end 29. The said supply channel 25 sloping pronouncedly from supply pan $25^a$ to the main wall line of box-base 1, being $1^d$, and $1^e$ to point $27^a$ when the same drops vertically, $27^a$ to point 28 of shallow depth thence proceeding at right angles from said vertical drop, immediately forming said concave trough basin 29, reaching to and hooked upon said doorway, by said hook flanges 30, as above described. The back wall portion of trough 31, is provided with a rectangular opening $13^e$ for the purpose of admitting the contents of supply channel 25, yet retaining a sufficient amount of said back wall $31^b$ at its bottom to retain contents, the top portion of said back wall portion of trough 31, above said rectangular opening $31^e$ being flanged at $31^d$ toward the inside of trough 31, to provide means $31^d$ for taking hold of and removing the same.

Having described the extension housings 17, which are attached at ends $1^d$ and $1^e$, of box-base 1, and a portion of supply channels 25, and the troughs 31, I proceed to describe the corresponding portions of supply channel 25, and troughs 31, which are attached within the sides $1^a$ of box-base 1, including therewith a description of the sides $1^a$ of said box-base 1, as follows: I cut a rectangular doorway $5^a$ in the side of box-base 1, and to the bottom end thereof I attach extendedly across the lower end of said partly cut away portion 7 a bent flange piece 9 of width corresponding to its width, and of length extending suitably to connect with the sides of the supply channel 25 on the lower rear portion of such bent flange piece 9, I provide guide means 11 consisting of grooved flanges laterally attached thereto by any suitable means, for the purpose of admitting and retaining a slide 10, which slide is used to regulate the outflow of the quantity of contents through the channel 25, into trough 31, being so arranged thereby that the same may be raised or lowered.

By bending the cutaway portion 7, inwardly I create a concave recess, such cutaway portion 7, thereof forming a roof to which roof, connectedly with the sides 1ª of such hole 5ª I attach at either side thereof conformable walls 7ª such walls 7ª extending downward and being secured to the sides of supply channel 25, for the purpose of retaining the temperature of the box-base 1. Having cut away portion 7, and bent the same inwardly, I have thus formed a doorway to such concave recess, within which I provide a swinging door 13, the lintel of such doorway being composed of an outwardly flanged attachment 12, to which the said door 13, is swung at its top by any suitable means 14, which door is of shape and size similar to the doors found in the extension housing.

Inasmuch as the cylindrical container 40 rotates toward one side only, I provide the means of preventing the overflow of contents connectedly with the supply channel and troughs of that side toward which said container 40 rotates, therefore the supply channel and trough door of the side toward which the cylindrical container turns, is constructed and attached, and operates the same as on the opposite side, excepting; I provide side walls 8 to the trough housing which extend upwardly to the top of box-base 1 and are attached to the side 1ª, of box-base 1 and within which the bilge shown as 52ª of Fig. 7, passes in its rotation, which side walls are constructed at their inner edges to conform to the cylindrical container 40.

Between side walls 8, I construct a bung slide trip 34, consisting of a strap secured by rivet 35 or other suitable means to the side walls 8, which strap is inclined angularly upwardly so that its flat surface when bent at right angles will conform to the cylindrical form of the cylindrical container 40, when it moves over the same; said strap having a U shaped bend 34ª in its center to admit catch 54ª of Fig. 10, passing through the same when container 40 is rotated, the opposite end of said strap being bent parallel to the first end and attached to sidewall 8, as the first, for the purpose of securing the same thereto; the purpose of said bung slide trip 34, being to automatically open the bilge 52ª by allowing the bung slide 54 to catch by its flange 54ᵇ upon the same and be drawn open when the rotating movement of cylindrical container 40, causes the two to contact, when container 40 is passing to point of rest as shown in Fig. 3, the opening of the said bung slide 54 letting the contents escape.

It will be observed that in double supply channels and double troughs, said bung slide trip 34, is extended in length, Fig. 12, only disclosing a broken portion, a double one being shown in full mounted in Fig. 2.

In said box-base 1, are provided supply-pans, 25ª which are constructed to fit immediately beneath the bilge 52ª when the said cylindrical container 40, is placed in delivering position, which supply-pans are connectedly supported in position by supply channels 25, which are constructed to radiate therefrom in four directions connectedly between such supply-pans 25ª and box-base 1, as shown in Figs. 1, 2 and 3 said supply-pans being slopingly constructed to aline with the separate compartments of the compartmental bung separator Fig. 11, and to empty the contents of each separate compartment by gravity into a corresponding supply channel, without intermixing the same as the said compartments of such pans are constructed with vertical flanges 26ª and are filled by the corresponding compartments of the cylindrical container when the same is rotated into delivering position. The double supply-pan 25ª and double supply channels 25 are constructed with definite and suitable dividing members 26 and 27 for the purpose of keeping the contents separated as shown in Figs. 1 and 2.

Supply channel 25 leading from supply-pan 25ª of 52ª to end 40ª is provided on its nether side with a pipe line 25ᶜ, leading to trough 31, and trough 31 is likewise formed with a divisional compartment wall 31ᵇ, constructed similar to its other walls, to one side of which trough is a connecting pipe 25ᵇ leading from supply pan 25ᵈ under walls 26, and under supply pan 25ª and supply channel 25 into trough 31ᶠ through outlet 31ᵍ.

Box-base 1, is provided with a fixed solid bottom 19, attached thereto by any ordinary means, constructed of any suitable material and is provided with sliding doors 3, which sliding doors are movably attached to said box-base 1 by groove flanges 4, at the ends 1ᵈ and 1ᵉ for the purpose of inserting any heating or cooling means, as desired, it being understood that said machine may be heated by lamp means 22, or any other suitable means and may be cooled by ice or running water introduced through sliding doors 3, and placed upon said floor 19, and the heating device may be placed for cooking purposes only under the concave trough basin 29, or supply channels 25 or supply pan 25ª, and the heat applied directly thereto, or set at one side thereof, when a warm temperature only is desired.

I provide in the box-base 1 and extension housing 17, circular vent air holes 20 and 21 respectively, for the purpose of supplying oxygen, so avoiding mold and mustiness, and to facilitate the existence and protraction of heat when the same is desired.

Within the ends 1$^d$ and 1$^e$ of the box-base 1, are constructed similar gage windows 36 and 36$^a$ and gage window slides 38 and 39 and grooved guides 37 and 37$^a$ as in the box-base cover 2, having similar slides, similarly constructed and similarly mounted and operated, conformably located to the several gages located on the ends of the cylindrical rotatable container 40 when the same is turned into delivering position, as shown in Figs. 5 and 6.

Within box-base 1, is rotatably mounted by flanged journal 45$^a$ and 45$^c$ and boxing 23 means, a cylindrical rotatable container 40, which container is constructed with separate compartments 41 and 42 each compartment being constructed to contain different things each having a false bottom which false bottom is constructed slopingly from the ends toward the bilge openings the sloping bottom of compartment 41, being designated by numeral 43, and the sloping bottom of compartment 42, being designated by numeral 44, which false bottoms are so constructed for the purpose of discharging the contents of such compartment to the bilge openings 41$^b$ in compartment 41 and 42$^l$ in compartment 42, when said container 40 is rotated, bilge downward without leaving any of the contents lodged within container compartments.

Compartment 41, consists of a single compartment and is formed by the construction across the diameter of said cylindrical rotatable container 40 of a diametrical dividing section 41$^a$ which describes its inner end and separates it from compartment 42 at the junction of said inner end 41$^a$ and on one side thereof opposite the floor end of the false bottom I construct a bilge 41$^b$ which has at its outer ends 40$^b$ holes 49, for the insertion of gage means 50, in which compartment 41, gage 51 is mounted.

The said gage 51 is provided in proximity thereto at one side parallel therewith upon the surface of the end 40$^b$ with figures 58 suitably calculated to indicate the liquid capacity of said compartment in gallons, and so arranged as to disclose through its transparency, the quantity stage of such contents.

Compartment 42 is subdivided into compartments 42$^b$, 42$^c$ and 42$^d$, the inner ends thereof being one side of a double diametrical wall one side of which diametrical wall is designated as 41$^a$ above referred to as being the inner end of compartment 41, the other wall thereof being as stated 42$^a$, and of exact dimensions of said wall 41$^a$, each so arranged with reference to the other as to leave an air space between the two walls, for the purpose of preventing sweating and conjoint heating, and the usual effects of dampness, heat and other conditions, affecting the other, when such compartments are filled with dissimilar substances, said walls being secured at their rims to the inside of the circumferential wall of the container 40 perforations 40$^c$ being made in said outer wall of the container 40, between the two walls 41$^a$ and 42$^a$ to admit air.

Compartment 42$^b$ is of triangular shape with its two side walls respectively 42$^e$ and 42$^f$ vertical and its outer end wall composed of the end wall of container 40$^a$ the inner point or apex of the triangle being wall 42$^a$, the top and bottom thereof being the circumferential wall of container 40. In the outer end 40$^a$ is provided the common gage 42$^l$ referred to above, provided for the purpose of disclosing outwardly through windows 36$^b$ and 36$^d$ by any transparent means, the contents and quantity by figures 59 contained therein; one corner of the inner point of such compartment 42$^b$ intersects the bilge 42$^l$ thus affording to it a V shaped orifice through bilge 42$^l$ of container 40, for filling and outlet purposes.

Compartment 42$^d$ is of half-cylindrical form, on one side formed by the wall of container 40, the opposite side being the inner side wall 42$^f$ which is vertical and is so formed by its conformation to compartment 42$^b$ its wider end being vertical and composed of inner diametrical wall 42$^a$ its outer diametrical wall being the side of compartment 42$^d$ of container 40. In the outer end 40$^a$ is provided the common gage 42$^l$ referred to above, provided for the purpose of disclosing outwardly through windows, 36$^c$ and 36, by any transparent means, the contents and quantity by figures 59 contained therein. One of the inner corners of compartment 42$^d$ also intersects bilge 42$^l$ thus affording to it a triangular shaped orifice through bilge 42$^l$ of container 40, for filling and outlet purposes.

Compartment 42$^c$ is an exact counter part of compartment 42$^d$ excepting that the said inner side vertical wall is numbered 42$^e$, and excepting that the gage 42$^g$ at the outer end 40$^a$, is single, and is provided for the purpose of disclosing outwardly through windows 36$^a$ and 36$^c$, by any transparent means, the contents and quantity by figures 60, contained therein.

It will be observed that the cylindrical rotatable container 40 is permitted only limited rotation between two points, thus moving downward only in one direction and when in filling position its bilge 52$^a$ is on its top-most side, therefore in turning the container 40 down so that bilge 52$^a$ may discharge its contents into supply-pan 25 its container would in case the bilge slide were not closed have a tendency to spill out to some extent and also in turning the bilges 52ª up from delivering position by rotating the container 40, upward, the contents would also spill out, to some extent, therefore I have provided at each side of each division of the bilge frame Fig. 7, separate annular flanges 56 and 57, each of width corresponding to the clearance between the wall of container 40 and the bottom of the supply-pan vertically disposed, and of length approximately corresponding to the distance from the bilge 52ª when in filling position to the flanged wall 8 of the trough housing and slightly overlapping the same, for the purpose of guiding any of the contents spilled out of the bilge 52ª in its process of rotation, into the supply channels 25, the separate annular flanges 56 and 57 are secured to the container 40, by any suitable means.

About the bilge holes 41ᵇ and 42ⁱ of container 40, I construct a double bilge frame 52 Fig. 7, each side having therein separate bilge holes 52ª, the whole built annularly conforming to the container 40, and of height making the same snugly conform between container 40 and cover 2, to avoid spilling of material and secured to said container 40, through holes 52ᵉ, by any suitable means, to accommodate the bilge 41ᵇ of compartment 41, and bilge 42ᶜ of compartment 42; the upper ends of each division above the bilge boxes 52ᶠ forming a T flange 52ᵈ thus making a device to receive and operate a bilge slide 54, shown as Fig. 10, for the purpose of covering bilge holes 52ª.

In the lower ends of each division of bilge frames 52, in the ends of bilge boxes 52ᶠ I provide transverse rectangular slots 52ᵍ paralleling said ends for the purpose of receiving over bilge holes 41ᵇ of compartment 41, and 42ⁱ of compartment 42, of container 40, compartmental bung separators Fig. 11. The compartmental separator of bilge hole 41ᵇ, is formed suitably to the contents of compartment 41, or entirely omitted in case liquid only is delivered therefrom. The compartmental bung separator Fig. 11, is also formed suitably to conform to the bilges of subcompartments 42ᵇ, 42ᶜ, and 42ᵈ, of compartment 42, of container 40, for the purpose of delivering the respective contents of each of said compartments in desirable quantity into supply-pans 25ª and for that purpose is provided with different sized holes, conforming to the contents of the respective sub-compartment over the bilge of which such portion of bung separator Fig. 11 fits.

Bung separator Fig. 11, is constructed for compartment 42, in three compartments, the center 55ª being triangularly formed to conform to the triangular bilge of sub-compartment 42ᵇ, and open and of size to conform with the contents of such sub-compartment 42ᵇ so that slops, mashes, cooked vegetables or milk may be fed therefrom.

One side of compartmental bung separator Fig. 11, is triangular to conform to the form of bilge of sub-compartment 42ᶜ, and is provided with perforations 55ᵇ, through which shelled corn may be fed.

The other side of compartmental bung separator Fig. 11, is triangular also, to conform to the form of bilge of sub-compartment 42ᵈ, and is provided with perforations 55ᶜ through which meals, shorts, and small and mixed grains may be fed.

It is obvious that compartmental bung separator Fig. 11, may be changed and varied to suit the various substances desired to be fed and to alternate and change the uses to which said sub-compartments 42ᵇ, 42ᶜ and 42ᵈ may be put, and the sizes of bilges and perforations may be altered to suit.

It is also obvious that by making compartments 41 and 42 divisional at wall 41ª and 42ª by centrally attaching to the outside of the inner ends of compartments 41 and 42 another flanged journal 45ᵇ and mounting each in a common boxing 23ᵏ which common boxing 23ᵏ is supported upon a common journal support 23ʲ, provided between said compartments 41 and 42, and secured by angle connections 23ᵉ, to box base 1, by ordinary rivet means, passing through holes not shown; and by providing crank means at the outward ends of each compartment (41 and 42) and by dividing the bilge frame 52, each compartment may be separately operated.

I claim:

1. A stock watering and feeding machine consisting of a box-base; a cylindrical rotatable double container rotatably mounted in said box-base operating in flangedly braced boxing means attached to either end of such box-base; supply-pans having connectedly formed sloping supply channels terminating at concave trough basin; suspendedly supported removable troughs, one of said troughs having compartments, pipe means for conducting water from a supply-pan to one of the compartments of said compartmental trough; supply channel means for conducting food and water from the supply-pans to said troughs; troughs having openly disposed rear ends, and upwardly sloping fronts, mounted within the outer ends of the supply channels, the supply channels being attached at their outer ends to the box-base; sliding end-gate means attached to the inner walls of the trough housings at the rear ends of the troughs; trough housings extendedly constructed connectedly secured at either end of said box-base; trough housings inwardly constructed connectedly secured within either side of said box-base; heat and ice storage cavity apartments between the supply-pans, supply channels and trough housings, and the bottom of said box-base; sliding end doors secured by flanged jamb means connectedly attached at either end of such cavity apartments in the bottom of said box-base, automatically swinging doors in the trough housings of said box-base; inwardly flanged corrugations in the bottom of said swinging doors; flanged content-regulating slides, attached to the rear of the said trough housings; extended circular apron walls connectedly attached to the sides of a supply channel and a trough housing; U shaped strap bilge slide tripping means attached to said extended circular apron walls and a supply channel within said box-base; separate inwardly constructed connectedly formed diametrical sub-compartmental walls transversely arranged within a cylindrical rotatable container, dividing the same into compartments, one of said sub-compartments having at its outer end a water gage vertically attached by angulated screw pipe means; an outwardly formed circumferential groove encircling cylindrical rotatable container, at a point exactly between said compartmental transverse walls; false bottoms inwardly secured in each sub-compartment of cylindrical rotatable container slopingly formed reaching from the outer ends to the bilge ends of such sub-compartments; a wedge-shaped sub-compartment having a false bottom, end gage means, and a V shaped opening forming a part of the bilge of the compartment; lateral sub-compartments at either side of the wedge-shaped sub-compartment, located within the compartment, each such sub-compartment having end gage means, and a triangular opening forming a part of the bilge of the compartment; journal means attached to either end of said cylindrical rotatable container, such journals having shoulder bosses between the flanged and bearing ends, the bearing end of one journal thereof respectively linearly suitably extending outward beyond the boxing, such extended end being squared, through such squared portion having transversely therein a hole; vertically disposed annular flanges linearly disposed between the bilge frame and the circular apron walls of one side of the cylindrical rotatable container and secured to the outer circumference of such container by suitable means; a double vertically disposed, conformably shaped bilge frame superimposedly fitting about the compartmental bilges of a cylindrical rotatable container, such bilge frame having a T end and square bilge parts, the bilge parts superimposedly arranged with reference to the bilges of the compartments of the cylindrical container, and having a rectangularly formed transverse parallel grooved perforation in its sides parallel to the bilge openings; the top of said bilge frame being open, but having bilge slide holding flanges grooved in the side and bottom end of its top, and secured to such cylindrical rotatable container by rivet means; a bilge slide having a flanged end angularly disposed for fitting in the said bilge slide holding flanges of said bilge frame, said bilge slide having a flanged end extending vertically upward from its uppermost end forming an opening trigger, and also having an angularly bent stopping means, conformable to the center groove in the slide trigger of the trough housing, attached by rivet means to the bottom end of said slide; consisting of a plate having sectionally divided perforated areas, one end provided with a flange, its length conformable to the width of one-half of the doubleable to the bilge frame, its width conformable to the bilge frame, its width conformable to the said rectangular transverse parallel groove in the side of the bilge frame; a box-base cover having a rectangular hole in its top and flanged edges around its skirt, its flanged edges having at either ends of said cover a double set of holes one set on either side of its center; the said cover being circularly conformable to the rotatable container; a circularly conformable cover over the hole in the top of said box-base cover, secured thereto by hinge and hasp means; a box-base having a rolled top edge having within such rolled edge a bracing rod; a double set of holes conjointly perforated through such rolled edge and inclosing rod, one set of such perforations being at either side of the center of either end, conformable to the holes in the flange of the ends of the box-base cover; a crank consisting of a rod having its ends turned at right angles one end slightly longer than the other, the shorter end containing a square boxing having a transverse hole through its walls; said crank mounted on the square ended journal of a cylindrical rotatable container and secured thereto by rivet means, and mounted by flanged boxing means, on a box-base, all for the purposes specified.

2. In a stock watering and feeding machine, a box-base having outwardly imposed end trough housings, and inwardly constructed side trough housings, a solid bottom, food and water carrying and feeding means, consisting of a divided supply-pan, channel means slopingly disposed leading from each supply-pan to a feeding trough the whole suspendedly attached above the bottom of the box base to the door sills of the respective trough housings, means for carrying both food and water and various kinds of foods from said supply-pans to three of said troughs, means for carrying water to another of said troughs, heat and ice cavity spaces beneath each of said pans channels and troughs door means attached to the outer walls of said trough housings, other door means attached to the ends of said box-base; food and water gage openings and doors attached to the ends of said box-base, curtains, and wall means inwardly attached to said trough housings, other curtain and wall means outwardly attached to one side of cylindrical rotatable container; boxing means connectedly attached to the top rim of said box-base; vertical plural perforations in the rim of said box-base at either end thereof; a removable cover fitted conformably on said box-base, said cover having a rectangular opening in its top, said rectangular hole covered by a hinged lid secured by a hasp, said cover also having flanged edges on its sides and ends, its end flanges being plurally perforated conformably to the plural perforations in rim of the box-base, said cover also having food and water gage openings and doors in its respective ends conformably to the water and food gage openings and doors in the box-base; a cylindrical rotatable food and water container mounted in said covered box-base, by journal means, said container having in one end a single compartment defined by a transverse circular wall inwardly vertically constructed, and having in its other end a compartment likewise defined by a transverse wall also vertically constructed, said circular transverse walls attached to each other at their sides and annularly attached at their edges inwardly to said container; each of said compartments opening through a common rectangular bilge inwardly divided by said diametrical walls; such latter compartment being divided into sub-compartments by longitudinally transverse walls arranged within said sub-compartments divergingly at acute angles from the bilge openings forming a wedge shaped central sub-compartment having vertical side walls, with the inside ends forming an apex at the center of the inside end wall of the compartment, with one corner of the apex thereof opening into a bilge of said compartment, each of said compartments opening through the bilge of such compartment, content gages inwardly connectedly attached and outwardly imposed upon the ends of each compartment; a bilge frame provided with covers, slides and content separator, superimposedly attached to the bilges of said compartments and means for operating, opening and closing the same; false bottom means slopingly arranged from the end directions centerward in each compartment, terminating at said bilge openings; crank means for rotating said cylindrical rotatable container; plural locking hole means commonly and superimposedly perforated in the end flanges and edges of the said box-base and cover, all for the purposes specified.

3. In a stock watering and feeding machine having a box base, a door secured at its top by hinge means to the walls of a trough housing, in such manner as to admit its being pushed inwardly, its bottom end inwardly bent to a curve to conform to the front end of the feed trough disposed within the outer end of a supply channel, said door having a corrugate groove inwardly bent crosswise therein immediately above its curved end; a trough housing disposed at the side of a box-base, the trough housing having a sloping top, side walls attached to the top portion, and to the end and bottom of the box base, a front wall portion attached to the side walls and bottom of the trough housing, immediately below the swinging door member; a supply channel disposed suspended connectedly between a supply pan and the door sill of a trough housing; a feed trough disposed in the outer end of a supply channel, the feed trough having a curved bottom, vertical ends and a vertical back wall and a curved front wall, the whole inclosed within the end of the supply channel, within said trough housing and connectedly attached between an offset in said supply channel at the back wall of the trough and the conformable bottom of the supply channel at the door opening of the trough housing, from which said supply channel is suspended, all for the purposes specified.

4. In a stock watering and feeding machine having a box base, a rotatable cylindrical compartment having a bilge opening at one side thereof adjacent to one of its ends, supply pan means centrally suspended within such box base below said rotatable cylindrical compartment, such supply pan arranged in line with the rotation of the bilge opening of the compartment; a door opening in the outer wall of a trough housing; a door opening in the wall of the box-base; a supply channel leading from the supply pan to the wall of the box base; a trough having the bottom and front end continuously uniformly curved, the rear end having a suitable opening conformable to the dimensions of the supply channel arranged within the outward end of the supply channel adjacent to the door opening in the wall of the box base; door means having inwardly terminating corrugations in the bottom end, hinge means at its top end suitably swung by said hinge means in the door opening of the wall of the box base adjacent to said trough, all for the purposes specified.

5. In a stock watering and feeding machine having rotatable containers mounted in a box-base; a container inwardly divided into sub-compartments and having a false bottom slopingly disposed toward a bilge opening, a bilge opening in one side of the container outwardly surrounded by a bilge frame, in one side thereof adjacent an end, said bilge opening being provided with subopenings conformable to the outlets of the compartments within the container; bilge frame means outwardly provided about the bilge of such container, the bilge frame being inwardly provided with slide means conformable to the outlets of the sub-compartments opening into said bilge of the container, said slide means capable of regulating the flow of contents of each sub-compartment through said bilge; supply pan means centrally suspended within said box-base below said rotatable containers, the supply pans arranged in line with the rotation of the said bilge openings, the supply pans also having compartments conformable to the openings of said bilge, such compartments being so formed as to empty conformably into divisions of supply channels; divisional wall means forming compartments provided in a container, said walls forming compartments convergingly disposed toward and forming outlet openings into said bilge openings; false bottom means slopingly disposed inwardly secured, directed toward the bilge, within a container; a supply channel outwardly disposed, having a downwardly sloping bottom, divisional walls longitudinally disposed, and an offset in its outer end, said supply channel connectedly attached between a supply pan and the outer wall of a trough housing; a trough housing having side walls, door openings, slide means provided in its back wall, the slide means suitable for closing the rear of the trough housing and for regulating the flow of the supply channel, the slide means operating in said back wall connectedly, right angularly and vertically with an offset in a supply channel and adjacent the rear wall of a feed trough; a trough mounted in a conformable offset provided in the outward end of a supply channel within the walls of a trough housing; vertical door means hingedly secured at its top disposed in the door opening provided in the outer wall of a trough housing, said door having a right angularly disposed corrugation directioned inwardly in its lower part, and also having its lower extremity flanged inwardly, suitably for conforming to the outwardly protruding lip of the trough, such door capable of inclosing a trough within a trough housing; all for the purposes specified.

6. In a stock watering and feeding machine having a rotatable container mounted in a box base, a supply pan secured in such box-base under such container, supply channel means connectedly suspended between such supply pan and the outer wall of a trough housing provided in the wall of a box-base; double divisional walls arranged parallel with its end walls within the container dividing the same into compartments, other divisional walls arranged right-angularly disposed to such end walls within a compartment, dividing such compartment into sub-compartments; air chambers between the walls of separate compartments; a bilge opening in each compartment, an opening in each sub-compartment, each opening opening into a bilge arranged to discharge into a supply pan arranged beneath the container, a supply channel attached between a supply pan and the outer wall of a trough housing, its outer end conforming to a trough; a removable trough loosely secured within the outward end of a supply channel adjacent to the outer wall of the trough housing of the box base, all for the purposes specified.

HENRY BURRMANN.

Witnesses:
JAMES N. WARD,
L. M. PECK.